United States Patent
Rajendran et al.

(10) Patent No.: US 12,120,752 B2
(45) Date of Patent: Oct. 15, 2024

(54) DYNAMIC BLANKING WITHIN PHYSICAL RESOURCE BLOCKS

(71) Applicant: DISH Wireless L.L.C., Littleton, CO (US)

(72) Inventors: Karupaiah Rajendran, Highlands Ranch, CO (US); Norberto Amaya Gonzalez, Littleton, CO (US)

(73) Assignee: DISH Wireless L.L.C., Littleton, CO (US)

( * ) Notice: Subject to any disclaimer, the term of this patent is extended or adjusted under 35 U.S.C. 154(b) by 41 days.

(21) Appl. No.: 18/075,891

(22) Filed: Dec. 6, 2022

(65) Prior Publication Data

US 2024/0188145 A1 Jun. 6, 2024

(51) Int. Cl.
*H04W 24/10* (2009.01)
*H04W 74/08* (2009.01)
*H04W 74/0833* (2024.01)

(52) U.S. Cl.
CPC ....... *H04W 74/0841* (2013.01); *H04W 24/10* (2013.01); *H04W 74/0875* (2013.01)

(58) Field of Classification Search
CPC ............. H04W 74/0841; H04W 24/10; H04W 74/0875
See application file for complete search history.

(56) References Cited

U.S. PATENT DOCUMENTS

| | | | |
|---|---|---|---|
| 2019/0181912 A1* | 6/2019 | Zhang | H04B 3/487 |
| 2019/0357253 A1 | 11/2019 | Di Girolamo et al. | |
| 2024/0032104 A1* | 1/2024 | Pinayour Chandrasekaran | H04W 72/27 |

* cited by examiner

*Primary Examiner* — Chuong A Ngo (74) *Attorney, Agent, or Firm* — Kilpatrick Townsend & Stockton LLP (57) ABSTRACT

Various arrangements for dynamically adjusting physical resource block (PRB) usage on a cellular network are presented. A primary entity may be determined to be exercising its priority to spectrum overlapping PRBs used by the cellular network. A frequency band being used by the primary entity based on measuring the signal strengths of wireless transmission by the primary entity can be determined. Subcarriers of the PRBs are identified that overlap the frequency band. A predefined Physical Random Access Channel (PRACH) format can be selected based at least in part on the identified subcarriers. A predefined Physical Uplink Control Channel (PUCCH) format can be selected based at least in part on the identified plurality of subcarriers.

20 Claims, 9 Drawing Sheets

PUCCH Formats

| | Format 0 | Format 1 | Format 2 | Format 3 | Format 4 |
|---|---|---|---|---|---|
| Carried UCI | Short | Long | Short | Long | Long |
| | HARQ/SR | HARQ/SR | Any | Any | Any |
| Duration in Symbols | 1-2 | 4-14 | 1-2 | 4-14 | 4-14 |
| Size in PRBs | 1 | 1 | 1-16 | 1-16 | 1 |
| CDM Capacity | 12 | 36 or 84 | 1 | 1 | 4-Feb |
| Multiplexing Method | Cyclic Shift | Cyclic Shift + TD-OCC | | | FD-OCC |
| Coding Scheme | | | Read-Muller for up to 11 its and Polar Code for > 11 bits | Read-Muller for up to 11 its and Polar Code for > 11 bits | Read-Muller for up to 11 its and Polar Code for > 11 bits |
| Modulation | | BPSK | >2 bits QPSK | 2 or more bits QPSK | 2 or more bits QPSK |

DYNAMIC BLANKING WITHIN PHYSICAL RESOURCE BLOCKS

BACKGROUND

Spectrum at desirable frequencies is a limited resource. Cellular networks may require a significant amount of spectrum to be able to communicate between base stations (BSs) and large numbers of user equipment (UE). Other, unrelated systems, such as weather satellite systems, may have the right to use particular portions of spectrum. However, when this spectrum is not being used by the system that has the initial right to the spectrum, the spectrum may be put to use by another system, such as a cellular system, that has a secondary right to the same spectrum.

SUMMARY

Various embodiments are described related to a method for dynamically adjusting physical resource block usage on a cellular network. In some embodiments, a method for dynamically adjusting physical resource block usage on a cellular network is described. The method may comprise determining, by the cellular network, that a primary entity may be exercising its priority to spectrum overlapping a plurality of physical resource blocks (PRBs) that may be used by the cellular network for communication with a plurality of user equipment (UE). The method may comprise measuring, by the cellular network, signal strengths of wireless transmissions by the primary entity on a plurality of frequency bands overlapping the plurality of PRBs. The method may comprise determining, by the cellular network, a frequency band of the plurality of frequency bands being used by the primary entity based on measuring the signal strengths of wireless transmission by a system of the primary entity. The method may comprise identifying, by the cellular network, a plurality of subcarriers of the plurality of PRBs. The plurality of subcarriers may overlap the frequency band. The method may comprise selecting, by the cellular network, a predefined Physical Random Access Channel (PRACH) format from a plurality of predefined PRACH formats based at least in part on the identified plurality of subcarriers. The method may comprise selecting, by the cellular network, a predefined Physical Uplink Control Channel (PUCCH) format from a plurality of predefined PUCCH formats based at least in part on the identified plurality of subcarriers. The method may comprise transmitting, by the cellular network, a first indication of the selected predefined PRACH format, a second indication of the selected predefined PUCCH format, or both to the plurality of UE communicating with the cellular network.

Embodiments of such a method may include one or more of the following features: the method may comprise communicating, between the cellular network and a piece of UE of the plurality of UE, using the selected PRACH format, the selected predefined PUCCH format, or both. The system of the primary entity may comprise a satellite and an earth station. The satellite and the earth station may communicate using the frequency band. Only a subset of base stations of a plurality of base stations of the cellular network may use the predefined PUCCH format, the predefined PRACH format, or both based on the identified predefined group of PRBs that overlaps the frequency band. Determining that the system of the primary entity may be exercising its priority to the spectrum overlapping the plurality of PRBs that may be used by the cellular network may be based at least in part on a current time. The method may further comprise, after transmitting the first indication and the second indication, determining that the system of the primary entity may be no longer exercising its priority to the spectrum overlapping the plurality of PRBs. The method may further comprise, in response to determining that the system of the primary entity may be no longer exercising its priority to the spectrum, releasing the cellular network from using the predefined PRACH format, the predefined PUCCH format, or both. The method may further comprise determining, by the cellular network, a sounding reference signal (SRS) structure to use based at least in part on the identified plurality of subcarriers. The SRS structure determined may be additionally based on the selected predefined PRACH format and the selected predefined PUCCH format. The cellular network may be a 5G New Radio (NR) cellular network.

In some embodiments, a cellular network system is described. The system may comprise a plurality of base stations. The system may comprise a blanking and configuration management system, configured to determine that a primary entity may be exercising its priority to spectrum overlapping a plurality of physical resource blocks (PRBs) that is used by a base station of the plurality of base stations for communication with a plurality of user equipment (UE). The system may be configured to determine signal strengths of wireless transmissions by the primary entity on a plurality of frequency bands overlapping the plurality of PRBs. The system may be configured to determine a frequency band of the plurality of frequency bands being used by the primary entity based on measuring the signal strengths of wireless transmissions by a system of the primary entity. The system may be configured to identify a plurality of subcarriers of the plurality of PRBs. The plurality of subcarriers may overlap the frequency band. The system may be configured to select a predefined Physical Random Access Channel (PRACH) format from a plurality of predefined PRACH formats and a PRACH location based at least in part on the identified plurality of subcarriers. The system may be configured to select a predefined Physical Uplink Control Channel (PUCCH) format from a plurality of predefined PUCCH formats based at least in part on the identified plurality of subcarriers. The system may be configured to transmit a first indication of the selected predefined PRACH format, a second indication of the selected predefined PUCCH format, or both to the plurality of UE communicating with the base station.

Embodiments of such a system may include one or more of the following features: the base station may be a gNodeB and the cellular network system is a 5G New Radio (NR) cellular network. The blanking and configuration management system may be part of the gNodeB. The blanking and configuration management system may be distinct from the gNodeB. The system may further comprise the plurality of UE that may include the UE. The base station and the piece of UE communicate using the selected PRACH format, the selected predefined PUCCH format, or both. The system may further comprise a primary entity system, comprising a satellite and an earth station. The satellite and the earth station may communicate using the frequency band. Only a subset of base stations of the plurality of base stations of the cellular network uses the predefined PUCCH format, the predefined PRACH format, or both based on the identified predefined group of PRBs that overlaps the frequency band. Determining that the primary entity may be exercising its priority to the spectrum overlapping the plurality of PRBs may be based at least in part on a predicted orbit of a satellite of the primary entity. The blanking and configuration management system may be further configured to determine that the system of the primary entity may be no longer exercising its priority to the spectrum overlapping the plurality of PRBs after transmitting the first indication and the second indication. The system may be configured to release the cellular network from using the predefined PRACH format, the predefined PUCCH format, or both in response to determining that the system of the primary entity may be no longer exercising its priority to the spectrum. The blanking and configuration management system may be further configured to determine a sounding reference signal (SRS) structure to use based at least in part on the identified plurality of subcarriers. The SRS structure determined may be additionally based on the selected predefined PRACH format and the selected predefined PUCCH format.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The use of spectrum for any purpose is highly regulated. This regulation is for good reason: if devices were allowed to broadcast at any frequency and at any power level, the amount of interference that would occur across unrelated systems would be immense. Instead, a regulatory body for a given geopolitical region (e.g., the Federal Communications Commission for the United States) has jurisdiction to regulate and allocate radio frequency (RF) spectrum.

Some spectrum is allocated to entities that have a first or highest priority to use that spectrum, but another entity may use that same spectrum when it is not being used by a primary entity (also referred to as a primary user) with the highest priority. Consider, for example, a satellite in a non-geosynchronous orbit that periodically passes over a satellite communication ground station. The satellite and ground station may only need to use their reserved spectrum when the satellite is within line-of-sight of the ground station for communication. At other times, in the vicinity of the ground station, the entity operating the ground station and satellite has no use for its reserved spectrum.

When the spectrum is unused by the primary entity, a secondary entity, which has the right to use the spectrum if the primary entity is not using the spectrum, can use the spectrum. The secondary entity may be permitted to use the spectrum as long as it causes no interference with the primary entity's use of the spectrum. In many embodiments detailed herein, the secondary entity is a cellular network while the primary user is a satellite operator, such as the United States' National Oceanic and Atmospheric Administration (NOAA).

In practice, the primary entity's use of spectrum may only overlap spectrum which the secondary entity is authorized to use. For example, adjacent to spectrum of the primary entity may be other spectrum where the secondary entity has primary rights. Therefore, when the primary entity is using its spectrum, only certain frequency bands may need to be avoided by the secondary entity. The secondary entity can continue to operate, for uplink and/or downlink, on the adjacent spectrum to which it has primary rights.

Periodically or occasionally vacating particular spectrum in order to give the primary entity unfettered access to its spectrum is highly complicated for a cellular network. Communication between cellular BSs and UE requires a significant amount of control messages to be transmitted between a BS and UE on predefined frequencies and times. On cellular networks, such as a 5G New Radio (NR) cellular network, subcarrier frequencies may be time divided up into slots for various orthogonal frequency-division multiplexing (OFDM) symbols (hereinafter "symbols"). A physical resource block (PRB) can represent a group of subcarrier frequencies (e.g., 12 subcarriers), within which one or more symbols may be transmitted.

A BS and the various pieces of UE communicating with the BS must exchange information to agree on the PRBs on which particular control information is to be sent between the UE and BS. Particularly, on a 5G NR cellular network, such control information can include control data sent as part of a PRACH and in the PUCCH. Various predefined formats exist for the PUCCH and PRACH, of which a single predefined format of each must be selected and used. Each predefined format has varying characteristics, including on which PRBs within a subframe control data is transmitted. Therefore, based on which portion of spectrum is currently being used by the primary entity, the cellular network can alter the PRACH, PUCCH, and SRS configuration used to allow the BS and UE to continue communicating while avoiding the specific spectrum being used by the primary entity. Therefore, despite a PRB overlapping one or more subcarriers that cannot be used due to use by the primary user, the remainder of the PRB can be used if the PRACH, PUCCH, and SRS can be configured such that the overlapping subcarriers are avoided or blanked. As long as the PRACH, PUCCH, and SRS are configured such that the overlapping subcarriers are blanked, the UE would not be assigned to send data on spectrum being used by the primary user.

As long as the cellular network avoids the spectrum actively being used by the primary entity, the cellular network can use the remaining spectrum for uplink (UE to BS) and downlink (BS to UE) communications. As detailed herein, the cellular network can identify that a primary entity (e.g., satellite operator) has priority to a particular portion of spectrum, such as at a particular time for a particular duration in a particular location (e.g., near the earth station of the primary entity communicating with the satellite). The cellular network can then identify which portion of the spectrum to which the primary entity has priority is being used by the primary entity. In response, the cellular network can set the PRACH format and PUCCH format to avoid the spectrum being used by the primary entity.

Figure 1:
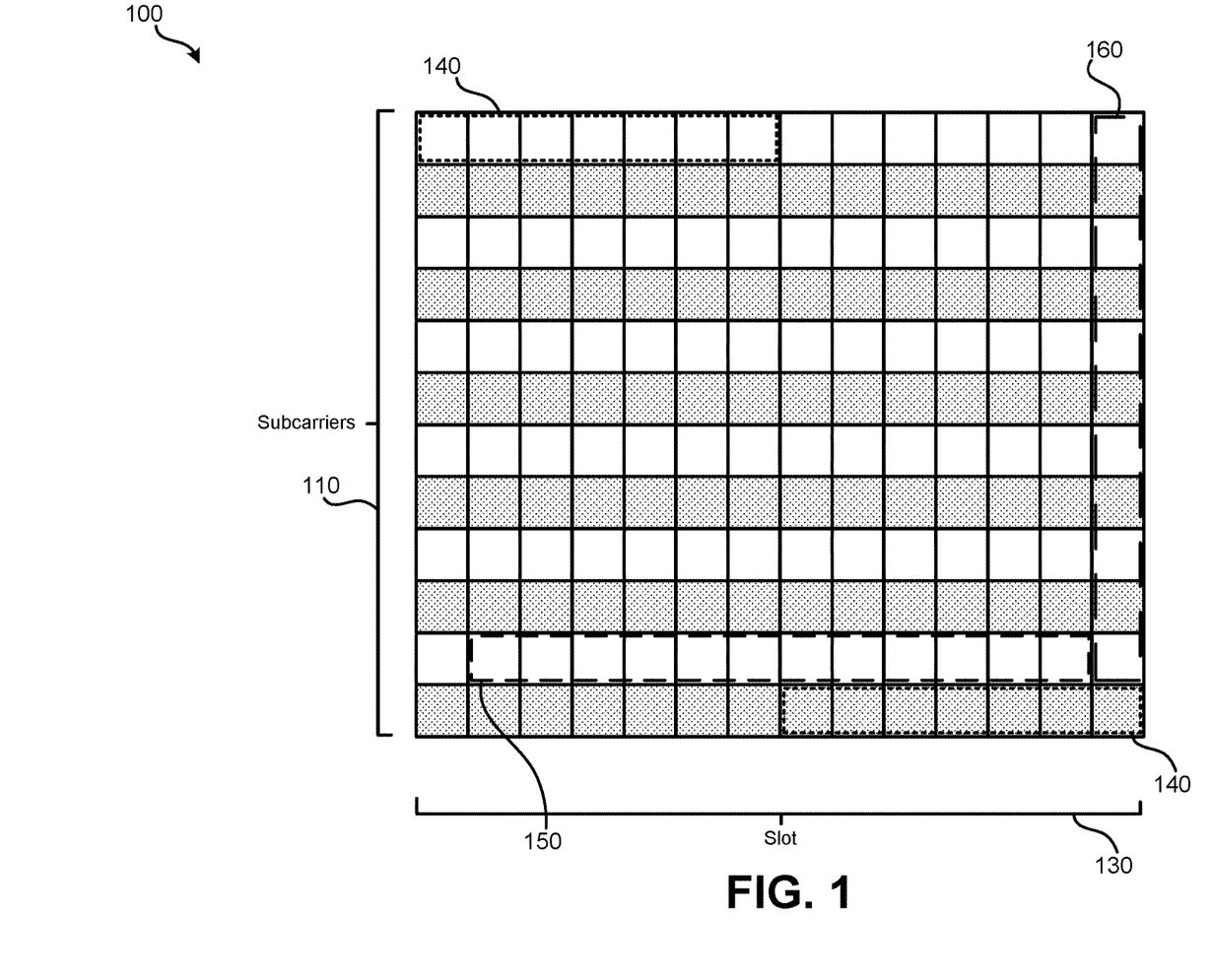
FIG. 1 illustrates an embodiment of physical resource blocks (PRBs) within which particular symbols have been assigned for particular Physical Random Access Channel (PRACH), Physical Uplink Control Channel (PUCCH), and sounding reference signal (SRS) formats.

FIG. 1 illustrates an embodiment 100 of physical resource blocks (PRBs) within which particular symbols have been assigned for particular PRACH, PUCCH, and SRS formats. The arrangement of embodiment 100 is specific to 5G New Radio (NR) cellular networks; however, similar principles can be applied to future forms of cellular communication protocols. In embodiment 100, along the y-axis, each row represents a different subcarrier frequency of subcarriers 110. Each subcarrier can represent a 15 kHz frequency band.

Along the x-axis, a single PRB can be the duration of a slot 130 and include 12 subcarrier frequencies. A column of embodiment 100, which includes 12 subcarriers, represents a single OFDM symbol. Therefore, within slot 130, 14 OFDM signals can be transmitted across the 12 subcarriers. Continuing along the x-axis additional PRBs at future times reuse the same subcarriers. Therefore, over time, many PRBs use the same frequencies.

Within the PRB, certain subcarriers and certain symbols are required to be reserved for various forms of control data. This control data can include the physical uplink control channel (PUCCH) data, the physical random access channel (PRACH), and, if used, a sounding reference signal (SRS). Each of these types of control data can be sent in various configurations (e.g., formats and locations within the PRB). In the example of embodiment 100, PUCCH data is being sent in a first format 140 that has a duration of 14 symbols, using two different subcarriers. Further, in this example, PRACH data is being sent in a format 150 over multiple symbols on a particular subcarrier. Finally, an SRS can be performed within the last six symbols of a slot. In this example, a last symbol of slot 130 is being used for SRS format 160.

Ideally, a cellular network would have access to the entirety of the subcarriers and symbols of embodiment 100. In such a circumstance, the formats used for PRACH, PUCCH, and SRS can be selected exclusively based on other factors, such as the cell size, number of UE, and other characteristics of the BS and UE.

Figure 2:
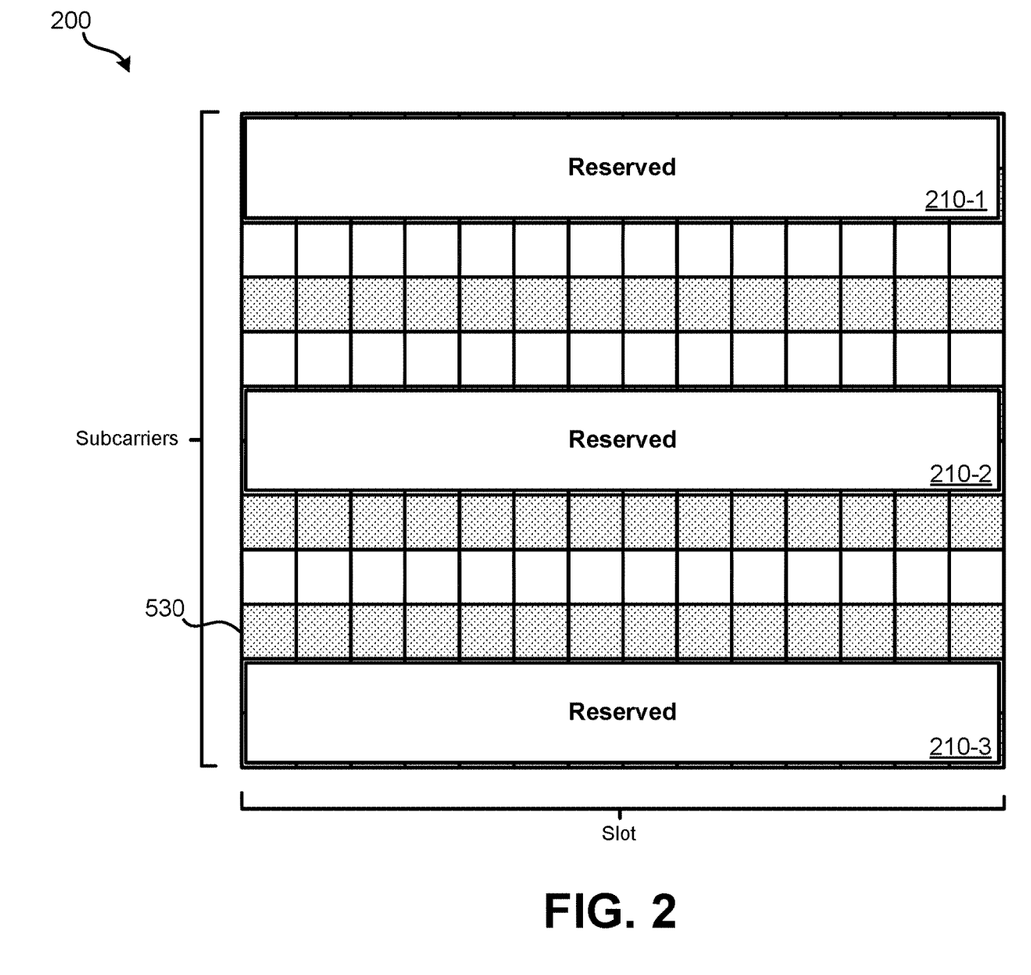
FIG. 2 illustrates an embodiment of the PRBs of FIG. 1 where a primary entity has priority to use particular frequency bands.

However, certain subcarriers may need to be avoided due to the cellular network not having the primary rights to the entirety of the spectrum. FIG. 2 illustrates an embodiment 200 of the PRB of FIG. 1 where a primary entity has priority to use particular frequency bands that overlap the subcarriers used by the cellular network. In embodiment 200, the same PRB of FIG. 1 is illustrated: however, the cellular network does not have primary rights to reserved bands 210. Whenever the primary entity desires to do so, the primary entity may have exclusive rights to the frequencies present at reserved frequency bands 210-1, 210-2, and 210-3. Therefore, when in use by the primary entity, the cellular network is not permitted to use the subcarriers that overlap with reserved bands 210. In the illustrated example of FIG. 2, three reserved frequency bands are illustrated. The arrangement as illustrated is merely exemplary. In other embodiments, there may be fewer reserved bands (e.g., 1 or 2) or more than three.

While a primary entity may have the right to use reserved bands 210 as needed, in practice, the amount of time that the primary entity may actually use reserved bands 210 can be small. As an example, the primary entity may use reserved bands 210 for communication with a low earth orbit (LEO) or middle earth orbit (MEO) satellite that is orbiting the earth. The primary entity can use a ground station to communicate with the satellite when a line-of-sight communication link can be established between the ground station and the satellite. When the satellite is not overhead, the ground station and the satellite, in this geographic vicinity, may remain unused by the primary entity. (In geographic regions where no ground station is present, the primary entity may have no use for the reserved bands and the secondary entity may not need to avoid use of the reserved bands.)

Additionally, in some circumstances, the primary entity may make use of only a single reserved band at a given time. Referring to FIG. 2, if the primary entity is using reserved band 210-2, the secondary entity may be permitted to use reserved frequency bands 210-1 and 210-3. The primary entity may maintain the right to switch which reserved band it uses at a given time; however the secondary entity can use the subcarriers that overlap the remaining unused reserved bands.

Figure 3:
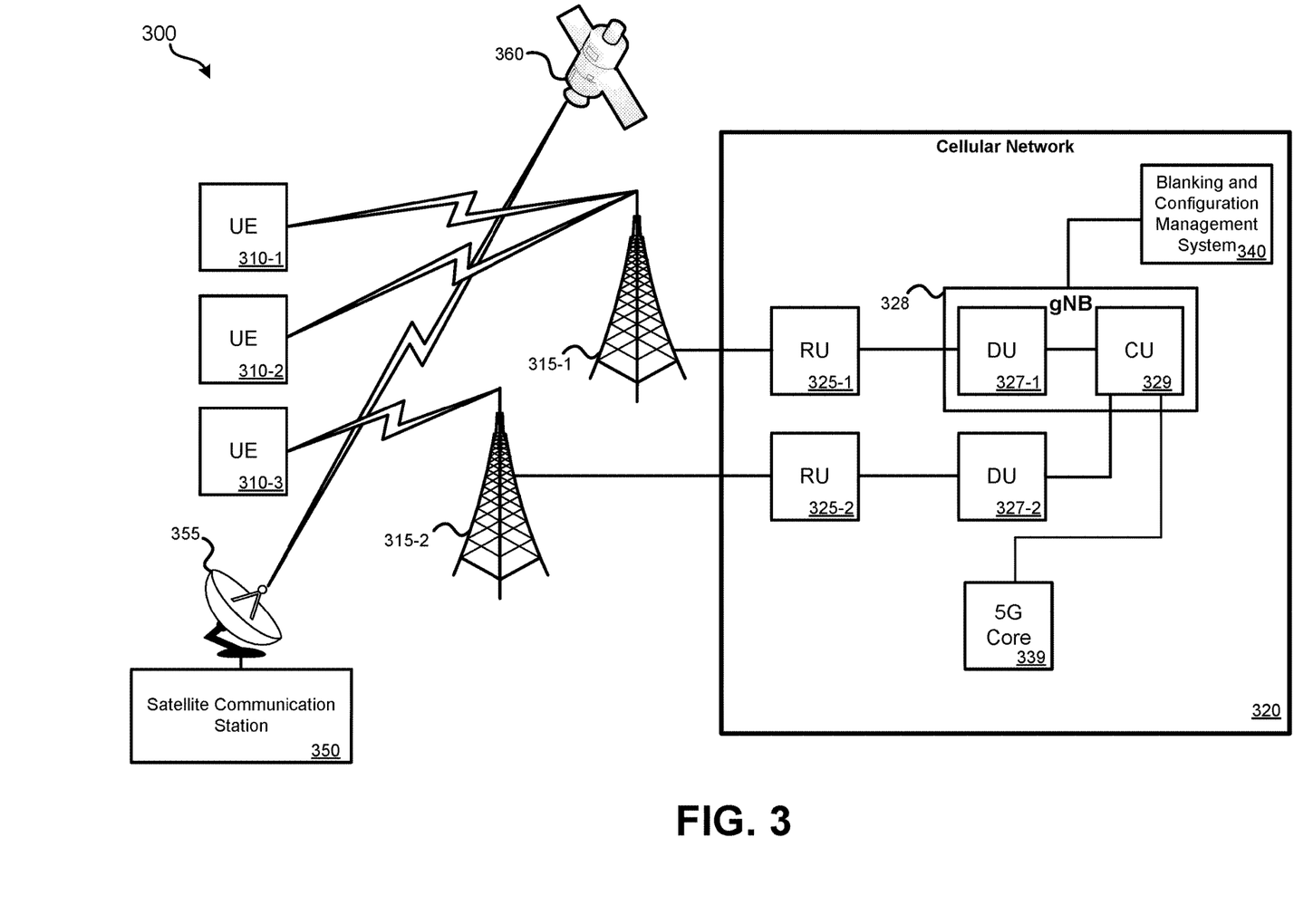
FIG. 3 illustrates an embodiment of a cellular network system for dynamically blanking PRBs and managing communication formats.

FIG. 3 illustrates a block diagram of an embodiment of a 5G cellular network system ("system 300"). System 300 can include a 5G New Radio (NR) cellular network or other types of cellular networks that permit slicing are also possible (e.g., future 6G and beyond cellular networks). System 300 can include: UE 310 (UE 310-1, UE 310-2, UE 310-3); base station 315; cellular network 320; radio units 325 ("RUs 325"); distributed units 327 ("DUs 327"); centralized unit 329 ("CU 329"); 5G core 339, and blanking and configuration management system 340 ("system 340"). FIG. 3 represents a component level view. In an open radio access network (O-RAN) using virtualization, components can be implemented as software, such as on a cloud-computing platform, except for components that need to receive and transmit RF. Therefore, the functionality of the various components can be shifted among different servers and/or data centers to accommodate where the functionality of such components is needed and/or where processing, storage, and/or bandwidth is available.

UE 310 can represent various types of end-user devices, such as smartphones, cellular modems, cellular-enabled computerized devices, sensor devices, gaming devices, access points (APs), any computerized device capable of communicating via a cellular network, etc. UE 310 may use RF to communicate with various BSs of cellular network 320. As illustrated, two base stations 315 (BS 315-1, 315-2) are illustrated. Real-world implementations of system 300 can include many (e.g., thousands) of base stations, RUs, DUs, and CUs. BS 315 can include one or more antennas that allow RUs 325 to communicate wirelessly with UE 310. RUs 325 can represent an edge of cellular network 320 where data is transitioned to wireless communication. The radio access technology (RAT) used by RU 325 may be 5G New Radio (NR), or some other RAT. The remainder of cellular network 320 may be based on an exclusive 5G architecture, a hybrid 4G/5G architecture, a 4G architecture, or some other cellular network architecture. Base station equipment may include an RU (e.g., RU 325-1) and a DU (e.g., DU 327-1). An RU and a DU can be co-located at a BS or a DU can be remote from the BS.

One or more RUs, such as RU 325-1, may communicate with DU 327-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of spectrum, such as, for example, band n71. One or more DUs, such as DU 327-1, may communicate with CU 329. Collectively, RUs, DUs, and CUs serve as the radio access network (RAN) of cellular network 320. CU 329 can communicate with 5G core 339. The specific architecture of cellular network 320 can vary by embodiment.

Multiple slices may function on the underlying hardware detailed in FIG. 3. That is, UE 310-1 and UE 310-2, while communicating with the same base station, may be provided with different QoS/QoE levels of service by virtue of being assigned to different slices. Each slice may be associated with differing performance characteristics. For each slice, many characteristics or parameters may be defined, such as: downlink/uplink throughput (aggregate for network slice); downlink/uplink throughput (per UE); maximum downlink/ uplink throughput; maximum supported packet size; mission critical level (e.g., compared to other network slices); radio spectrum; packet error rate; supported access technologies; supported device velocity for a defined QoS; uplink throughput (aggregate for network slice); maximum uplink throughput; and/or synchronicity. Other parameters for a slice may also be defined, such as: a defined latency range for specific end-points; reserved or shared spectrum; one or more particular security profiles; optimization for specific applications or sets of applications (e.g., healthcare applications, industrial applications); optimization for high-speed mobility; and varying degrees of customer-side control of network parameters. Other parameters may also be defined, such as parameters for individual layers within each network slice. Such individual layers may allow for particular types of data or data associated with particular applications to be prioritized over other applications.

Blanking and configuration management system 340 may be one or more computer servers or a process that hosted on a cloud-based computing platform. System 340 may be in communication with components of cellular network 320, such as directly with a DU or CU of a gNodeB (e.g., gNB 328) at which blanking needs to be performed. At a high level, blanking and configuration management system 340 schedules PRB blanking for individual BSs to accommodate reserved frequency bands being used by one or more primary entities. In some embodiments, rather than having a centralized blanking and configuration management system 340, system 340 may be incorporated as part of or in communication with each gNB of the cellular network that needs to occasionally avoid a primary entity's frequency band(s).

Functioning independently of the cellular network can be satellite ground communication station 350, satellite antenna 355, and satellite 360. Satellite ground communication station 350 communicates with satellite 360 via satellite antenna 355 on one or more particular frequency bands. If UE 310 and/or BSs 315 are operating on the same or overlapping subcarriers, interference can result in satellite ground communication station 350 and satellite 360 being unable to communicate or can result in decreased quality of service. Satellite 360 may be in LEO or MEO and communication between satellite ground communication station 350 and satellite 360 may only occur when the orbit of satellite 360 allows for a line of sight communication link between satellite antenna 355 and an antenna of satellite 360. Satellite ground communication station 350 may also periodically or occasionally communicate with one or more other satellites, possibly using the same or different frequency bands. In the embodiments detailed herein, the operator of satellite ground communication station 350 and satellite 360 is the primary user of the one or more particular frequency bands. Accordingly, the cellular network operator is required to not interfere with the operations of the satellite operator.

Figure 4:
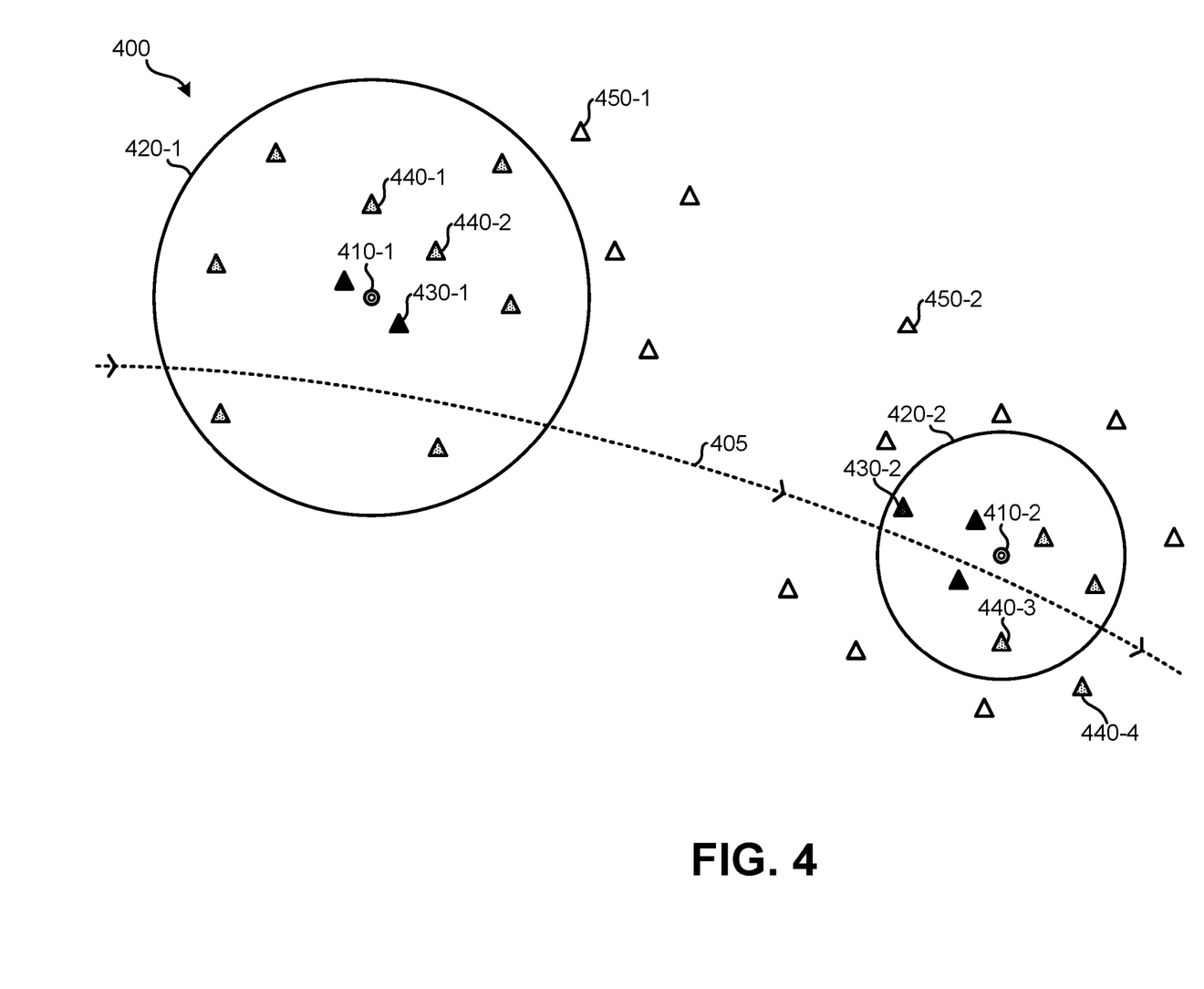
FIG. 4 illustrates an embodiment of base stations that are proximate to ground stations of a satellite system that has priority to spectrum also used by the cellular network.

FIG. 4 illustrates how a frequency band being used by a primary entity may only need to be avoided by a secondary entity: 1) in the vicinity of a satellite ground communication station (i.e., within a distance within which the BS and/or UE can cause interference); and 2) when the satellite ground communication station is actively communicating with a satellite. FIG. 4 illustrates an embodiment 400 geographical region over which satellite communication stations are operated. In embodiment 400, a satellite antenna and satellite communication station are at location 410-1; a second satellite antenna and a second satellite communication station are at location 410-2. Each of these satellite antennas and communication stations communicate with a satellite while the satellite is within line-of-sight. The satellite follows orbital path 405 over the Earth. While FIG. 4 shows the location of base stations, it should be understood that in some embodiments the sources of interference are uplink communications that originate from UE and are transmitted to the base stations of FIG. 4. As such, to eliminate such interference, coordination across all (or almost all) of the UE in communication with the base stations relatively nearby locations 410 may be needed.

The satellite ground communication stations' antennas may have different amounts of gain and beam patterns. The gain and directionality can affect how susceptible the signals being received and transmitted by the satellite antenna are to interference. Regions 420 can be defined by the satellite operator and can represent regions within which cellular equipment could potentially interfere with communications between a satellite communication station and a satellite, given the properties of the satellite antenna (and possibly other conditions and equipment). For example, region 420-2 is smaller than region 420-1 because the equipment, including the satellite antenna, at location 410-2 has a higher gain and/or greater directionality, and thus is less susceptible to interference from cellular equipment that is farther away.

Based on regions 420 as defined by the satellite operator, the cellular network operator may be required to provide locations of all base stations located within these regions. Using the locations of the base stations, possibly along with other parameters of the base stations, such as the height, azimuth, electrical tilt and power level, modeling may be performed to determine the amount of interference that the base station and/or UE communicating with the base station will cause. Based upon the modeled amount of interference, the cellular network may be provided with at least two classifications of base stations: 1) a first BS classification for base stations at which an entire frequency band is required to be blocked from use when communication is occurring between the satellite and the satellite communication station; and 4) a second BS classification for base stations at which PRB blanking is required to be performed on a more limited range of frequencies when communication is occurring between the satellite and the satellite communication station.

Therefore, in the case of very nearby locations 410, more aggressive blanking may need to be performed than at greater distances from locations 410. As an example, referring to FIG. 2, nearby locations 410, the entirety of the subcarrier frequencies may not be used when satellite communication is active. At a greater distance from locations 410, blanking as detailed herein may be performed. In other embodiments, blanking as detailed herein may be performed for all BS and UE relatively near locations 410.

In embodiment 400, modelling indicated that the base station 430-1 should have an entire frequency band blocked. While the satellite and satellite communication station may not use the entire frequency band, out of band emissions may cause interference due to the close proximity between base station 430-1 and location 410-1. Other base stations similarly marked with a black triangle in FIG. 4 may also have been identified by the modeling to require the entire frequency band to be blocked. Base stations 440-1, 440-2, and 440-3 may have been identified based on modeling to only require that the actual frequency band used for satellite communication (and possibly an upper and lower guard band) to be blocked. Other base stations similarly marked with dotted triangles in FIG. 4 may also have been identified by the modeling to require a limited blocking arrangement.

Further detail regarding the difference between the blocking or disablement of a frequency band as compared with a more limited blocking of particular PRBs within a frequency band is provided in relation to FIG. 4.

While modelling may be relatively accurate to determine base stations and/or UE that are in communication with those base stations that are likely to cause interference, real-world measurements may necessitate an adjustment. For example, while base station 430-2 is not as physically proximate to location 410-2 as other base stations, interference measurements made at location 410-2 may indicate that above a threshold amount of interference is originating from either base station 430-2 itself or UE that are in communication with base station 430-2.

Similarly, base station 440-4, which is outside the region for which modelling was initially performed, may either directly or via UE in communication with BS 440-4 cause interference with satellite communication at location 410-2. As such, at BS 440-4, limited PRB blanking may be performed to eliminate interference. In some embodiments, such as for base station 440-4, no blanking or other action may be taken since communication between UE and the BS will not interfere with satellite-to-ground station communication. Base stations marked by a white triangle, such as base stations 450, may not need to perform any actions regarding interference and can use the entirety of the frequency band for which the satellite operator is the primary user as desired.

Figure 5:
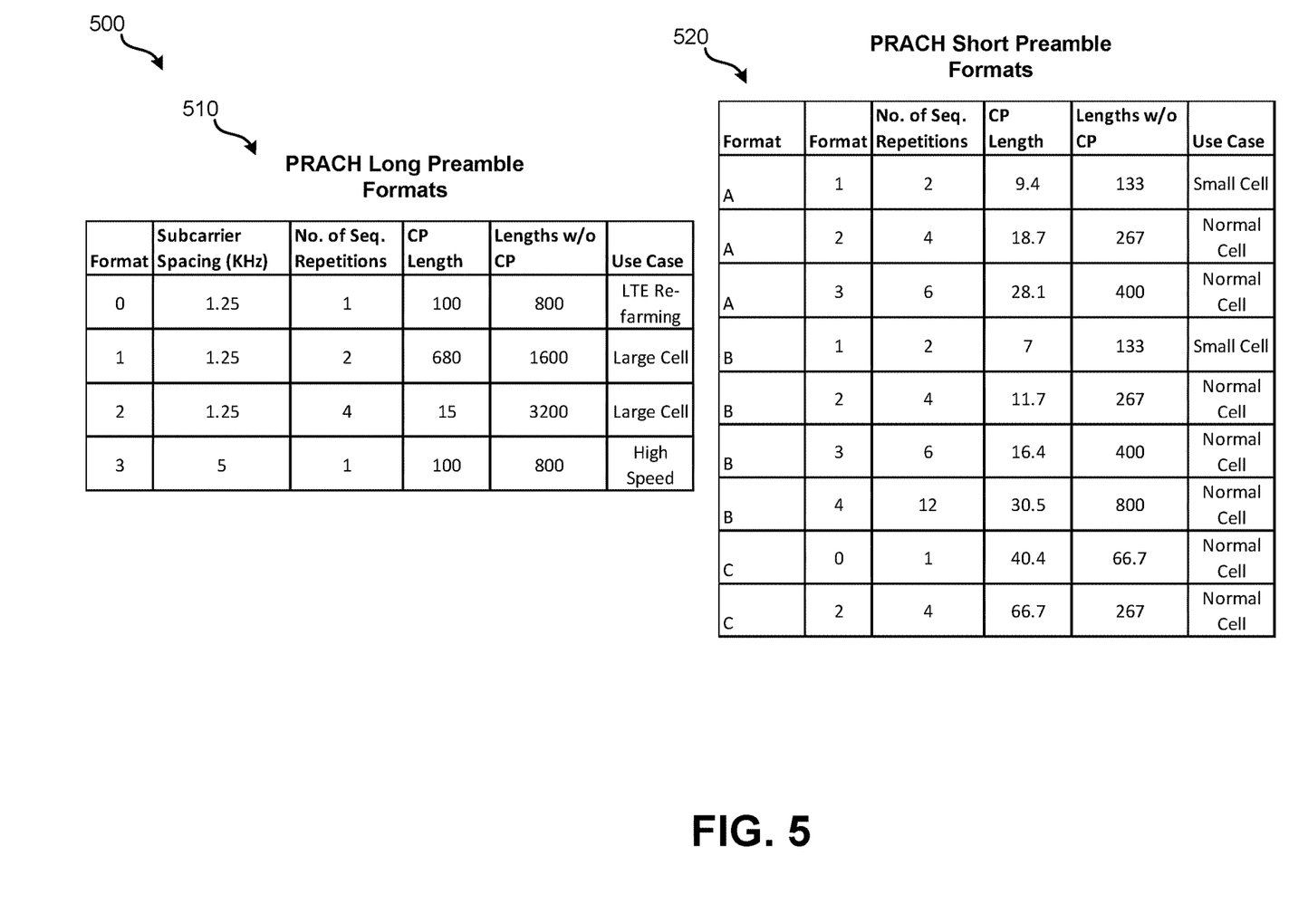
FIG. 5 illustrates an embodiment of a table detailing various predefined PRACH formats which can be used for communication between a BS and UE.

In circumstances where blanking is to be performed to avoid a frequency band being actively used by the primary user, the formats and configurations used by the cellular network for PRACH, PUCCH, and SRS can need to be changed or at least confirmed to not interfere with the primary user. FIG. 5 illustrates an embodiment 500 of tables detailing various predefined PRACH formats which can be used for communication between a BS and UE. In general, a preamble is sent by a UE to the BS over the PRACH channel to obtain uplink synchronization. The preamble includes a cyclic prefix (CP) and a preamble sequence. In 5G, as an example, there are 13 supported preamble formats, as shown in PRACH long preamble format tables 510 and PRACH short preamble formats table 520.

When selecting a PRACH format for while blanking of subcarriers is to be performed to avoid overlapping with use with a primary user, various factors are analyzed. These factors can include: the desired subcarrier spacing, whether a long format can be accommodated or only a short format, the use case of the cell created by the base station (e.g., the number of UE that can be accommodated). At a given time, a BS can use only a single PRACH format across all UEs with which it is communicating.

The location of the PRACH within the subcarrier frequencies of the uplink physical channel structure may be selected (by blanking and configuration management system 340) to avoid the frequency band being used by the primary user. Therefore, for example, referring to FIG. 2, if reserved frequency band 210-3 is being used by the primary user, the PRACH may be set by the BS to be on subcarrier 530.

Figure 6:
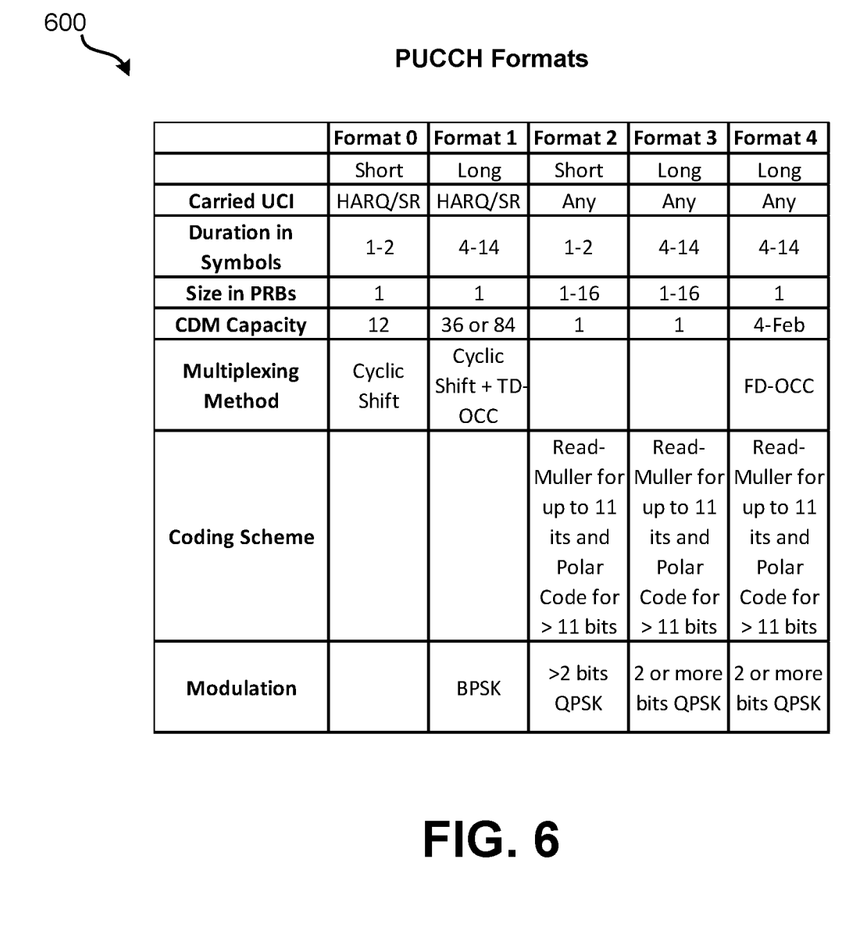
FIG. 6 illustrates an embodiment of a table detailing various predefined PUCCH formats which can be used for communication between a BS and UE.

The PUCCH is used to transmit uplink control information (UCI). While the PRACH may be assigned by the BS to any available subcarrier, the PUCCH may need to conform to a predefined PUCCH format (e.g., 0-4) that defines particular subcarriers and symbols at which the PUCCH data must be sent. FIG. 6 illustrates an embodiment of a table 600 detailing characteristics of various predefined PUCCH formats which can be used for communication between a BS and UE. The PUCCH may be either in a long format or short format. A long format may be useful for a use case of increasing coverage, while a shorter format allows for a use case having a lower latency. However, the long format may require the use of particular subcarriers and may require the use of 4-14 symbols, while the short format may use only 1-2 symbols (and different subcarriers).

Depending on the subcarriers that have been blanked to account for the frequency band(s) being used by the primary user of the spectrum, the PUCCH format can be selected. Additional factors that can be used to select the PUCCH format include: the subcarrier and symbols already assigned for the PRACH and the use case.

For example, based on the reserved frequency band(s) for the primary entity, the use, case, and, possibly, the subcarrier reserved for the PRACH, only particular PUCCH formats may be permissible, such as PUCCH format 0 or format 2, which includes reservations of particular subcarriers in the final one or two symbols of the PRB. In other situations, a long format PUCCH may be selected based on the use case and available resources, such as PUCCH format 1, which makes use of a first and last subcarrier.

Referring to FIG. 2, as an example, a long format PUCCH (e.g., 1, 3, or 4) may only be possible if the frequency band being used by the primary user is reserved band 210-2, thus making it possible for the cellular network to use the first and last subcarriers without interference with the primary user's communications. Alternatively, if the primary user is using reserved frequency band 210-1 or reserved frequency bank 210-3, the cellular network may be forced to select from PUCCH format 0 or 1, which does not make use of the first or last subcarrier.

Figure 7:
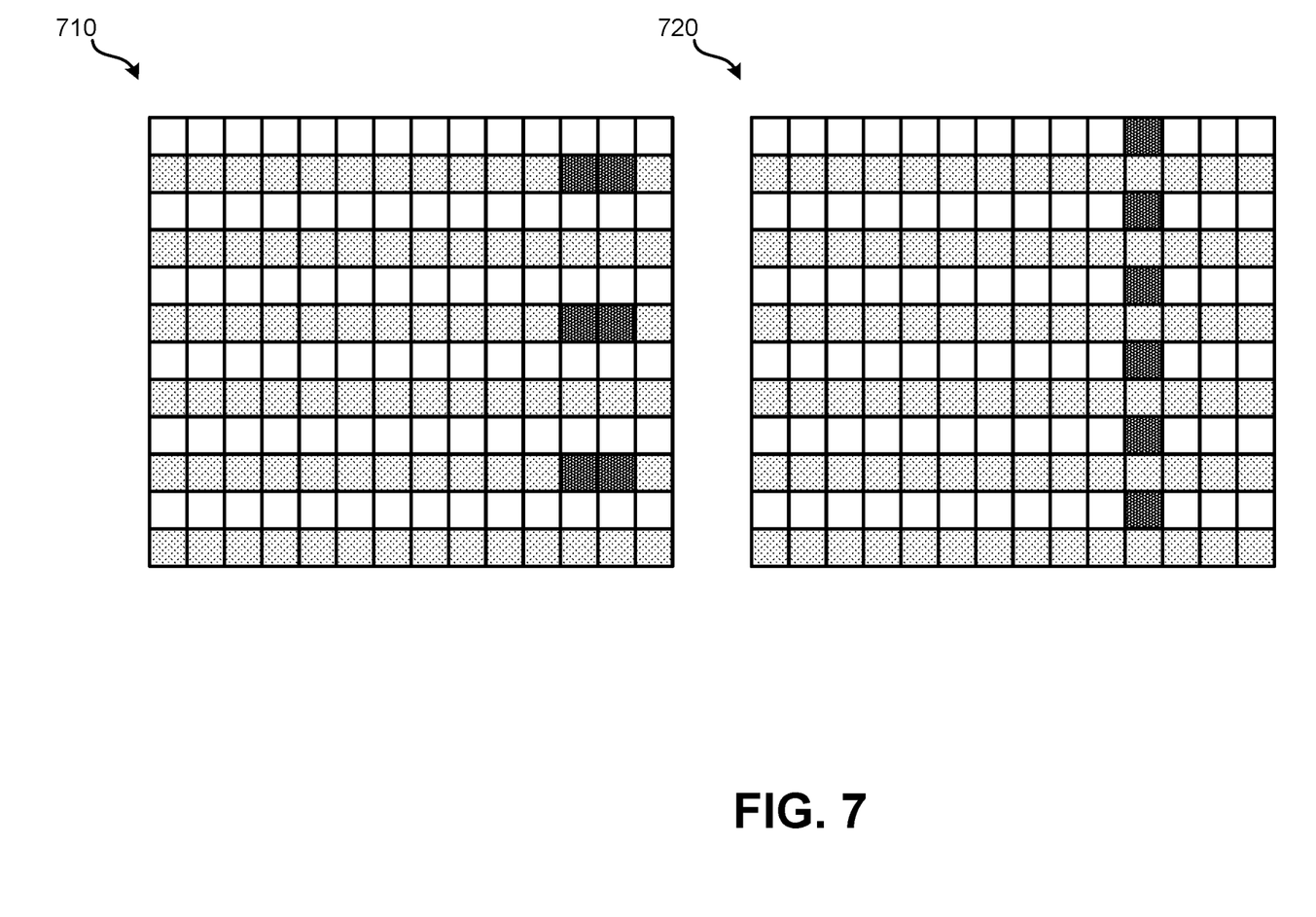
FIG. 7 illustrates an embodiment of different SRS structures that can be used for communication between a BS and UE.

An SRS is an optional uplink reference signal that is transmitted by UE to the BS. The SRS provides information about the effects of multipath fading, scattering, Doppler, and power loss of transmitted signal. The BS can then estimate the channel quality using the SRS to perform resource scheduling. Use of SRS is optional and, therefore, can be disabled by the base station, if needed. FIG. 7 illustrates an embodiment 700 of different SRS structures that can be used for communication between a UE and BS. System 340 can assign a time and structure for SRS to be sent by UE. In the time domain, the SRS may be permitted to be anywhere within the last six symbols of a slot. The SRS may span one, two, or four consecutive OFDM symbols. In the frequency domain, the SRS can have a "comb 2" or "comb 4" structure such that the SRS is transmitted on every second or fourth subcarrier, thus allowing multiple UE's SRS to be frequency multiplexed. In FIG. 7, SRS structure 710 illustrates an example of a comb 4 structure over two symbols; SRS structure 720 illustrates an example of a comb 2 structure over a single symbol, which is fourth from last symbol. In SRS structures 710 and 720, the other subcarriers within the same symbols may be used for other SRS of other UE.

The SRS selected by the BS for a UE (the SRS used for each UE can vary in location to allow for multiplexing) is positioned with the PRB to avoid interference with the reserved frequency band being used by the primary entity, the selected PRACH format, and the selected PUCCH format. Within a predefined SRS format, specific subcarriers can be skipped by the UE based on an instruction from system 340 to avoid the frequency band(s) being used by the primary user.

Figure 8A:
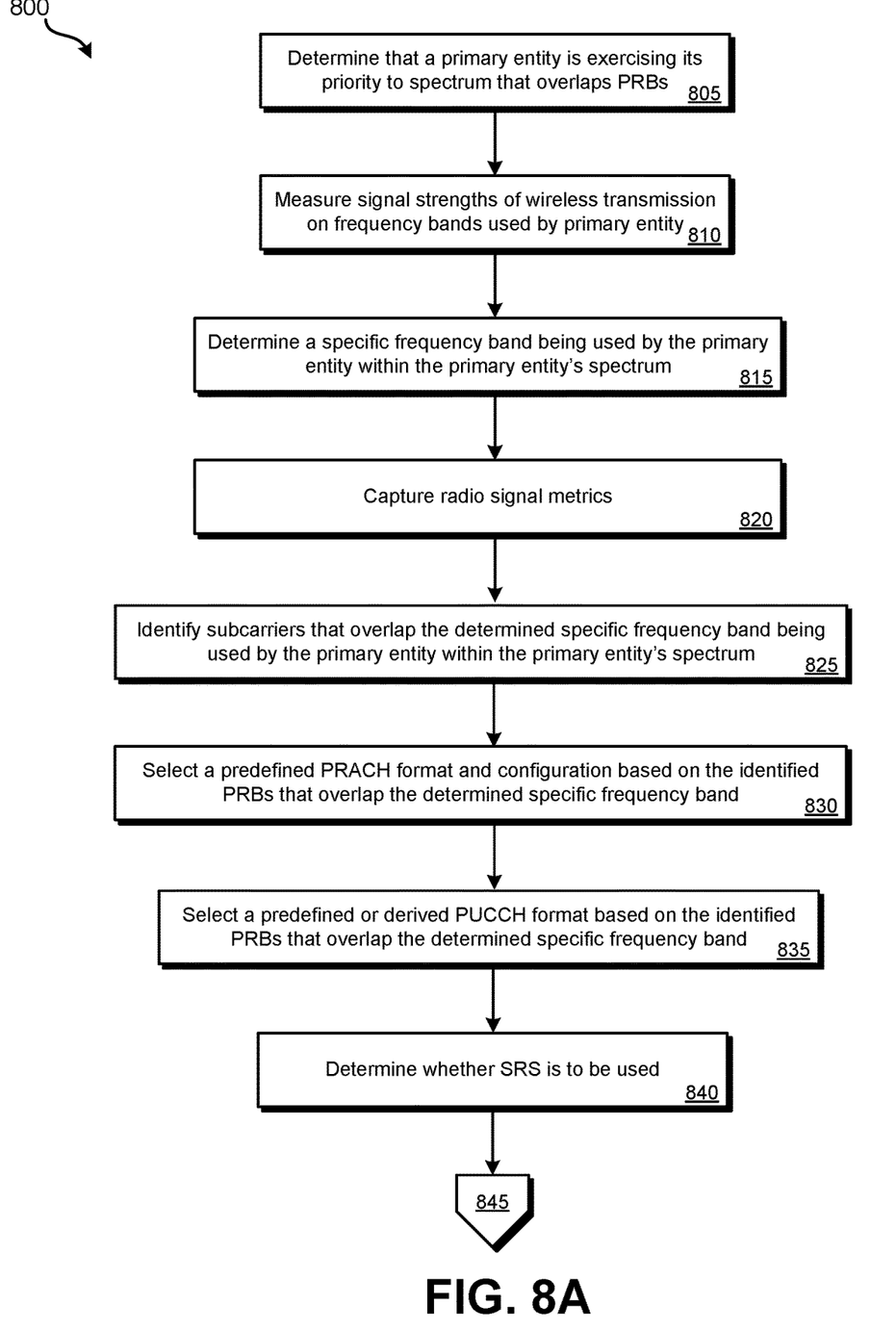
FIGS. 8A and 8B illustrate an embodiment of a method for dynamically adjusting physical resource block usage for a base station of a cellular network.
Figure 8B:
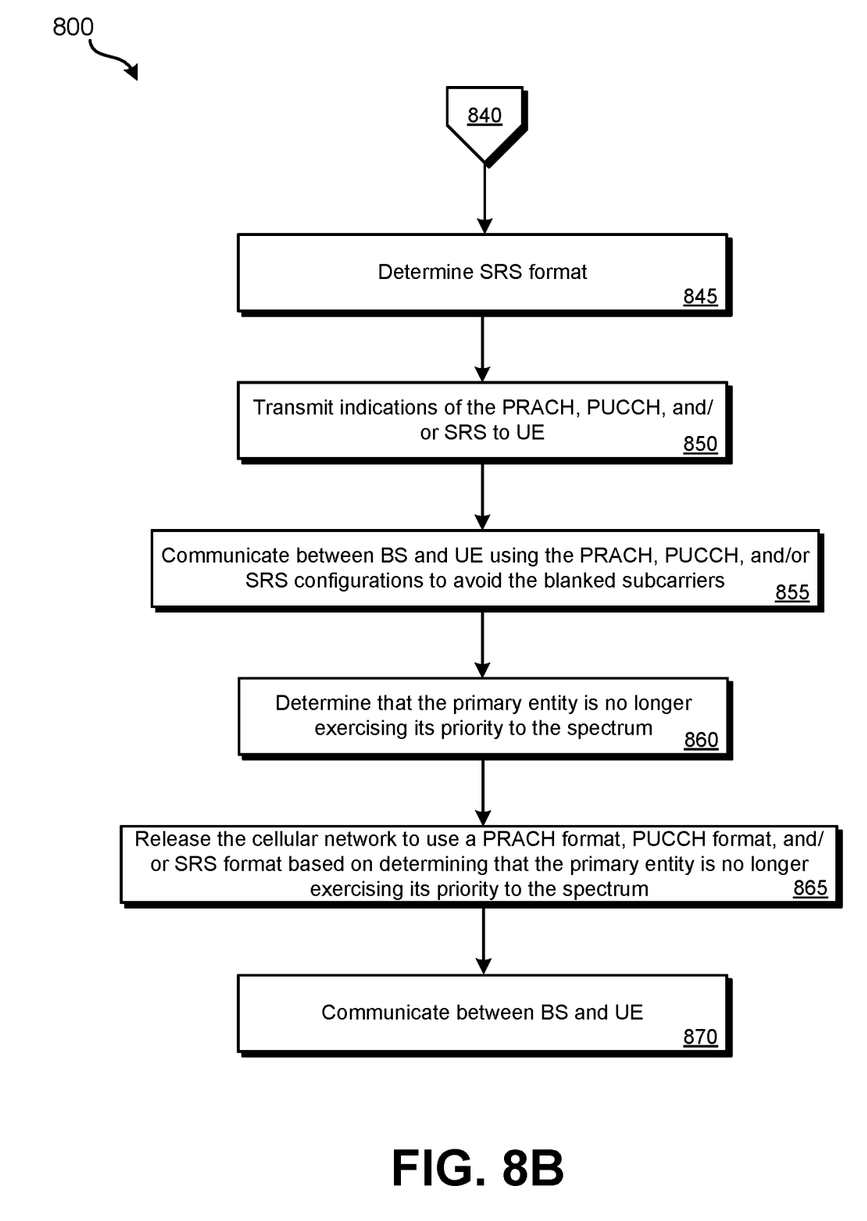

FIGS. 8A and 8B illustrate an embodiment of a method 800 for dynamically adjusting physical resource block usage for a base station of a cellular network. The blocks of method 800 can each be performed by a blanking and configuration management system, such as that detailed in FIG. 3. Such a system can be incorporated as part of an individual base station (or gNB) or can manage blanking for multiple base stations.

Beginning at block 805 on FIG. 8A, a determination can be made that a primary entity is exercising its priority to use particular spectrum. For a primary entity that is operating a satellite, this determination may be based on determining when the orbit of the satellite is within a line-of-sight of a ground station of the primary entity. As an example, the primary entity may provide tracking information for the satellite or may provide a resource (e.g., website, API) for the secondary entity to determine when the satellite is scheduled to communicate with the ground station. A margin of error may be built-in such that the secondary entity ceases using the restricted spectrum a time ahead of when the primary entity is scheduled to begin using it.

If multiple reserved frequency bands are present and the primary entity may only use a subset (e.g., one) of the multiple reserved frequency bands at a given time, block 810 may be performed. At block 810, a signal strength of each reserved frequency band may be measured. The signal strengths measured at block 810 can be used at block 815 to determine which frequency band is being used by the primary entity. The remaining unused frequency bands may be used by the secondary entity because the secondary entity has the secondary rights to the spectrum and the primary entity is not exercising its right to use the spectrum.

At block 820, various signal metrics, such as signal-to-interference noise ratio (SINR) and received signal strength indicator (RSSI), can be captured, such as for specific PRBs. This data can be linked to a timestamp. This signal data can be used to prove to the primary entity that the correct frequency band is being avoided by the secondary entity while the primary entity is exercising its rights.

At block 825, one or more subcarriers of PRBs that overlap the specific frequency band (or bands) being used by the primary entity within the primary entity's reserved spectrum are identified. These one or more subcarriers are blanked for the duration of time that the primary entity is exercising its right to the frequency band. If the PRACH, PUCCH, and/or SRS currently being used by the BS overlaps with the one or more subcarriers being blanked, the PRACH, PUCCH, and/or SRS formats need to be updated such that the subcarriers can be blanked.

At block 830, a PRACH format and configuration can be selected. The PRACH format and location in the PRB can be selected based on the one or more subcarriers that are required to be avoided as identified at block 815. The PRACH can additionally be based on the use case, desired SCS, and whether a short or long format preamble is to be used. While in FIG. 8A, the PRACH format and location are selected ahead of the PUCCH format; in other embodiments, the PRACH format can additionally be defined based on which predefined PUCCH format is to be used. That is, the PUCCH format may be selected ahead of the PRACH format or the subcarrier used for the PRACH may take into account the subcarriers used by the available PUCCH formats.

At block 835, a PUCCH format and configuration can be selected. The PUCCH format is selected from a group of four predefined PUCCH formats as detailed in relation to FIG. 6. Each of these formats specify specific subcarriers and symbols of a PRB. The PUCCH format and location in the PRB can be selected based on the one or more subcarriers that are required to be avoided as identified at block 815. The PUCCH can additionally be based on the use case, capacity, modulation, UCI, and whether a short or long format preamble is to be used. If the PRACH format and location have already been determined, the PUCCH format can be selected to avoid overlap with the PRACH.

A determination as to whether UE are to be configured to use an SRS is made at block 840. Use of SRS may be optional and, therefore, can be skipped. Method 800 continues in FIG. 8B. If overlap with blanked subcarriers is unavoidable, the SRS may be disabled. Disabling use of the SRS can also have the advantage of freeing more resources for data transfer. At block 845, an SRS format (i.e., comb 2 or comb 4) can be selected along with a location within the last six symbols and duration in the form of a number of symbols (1, 2, or 4) to be used for the SRS within the PRB. The SRS format, location, and duration can be selected based on: the subcarriers required to be avoided as identified at block 815, the previously selected PRACH format and location, and/or the previously selected PUCCH format.

Following block 845, a PUCCH format, a PRACH formation and location, and, possibly an SRS format, duration, and location have been selected that do not interfere with the subcarriers blocked based on block 815 and do not interfere with each other. At block 850, the blanking and configuration management system may provide this information to the base station. The base station may then transmit indications of the PRACH (format and location), PUCCH (format), and SRS format, location, and duration, if used to each UE. A time may be provided at which the UE are to start using the updated PRACH, PUCCH, and SRS.

It may not always be necessary to modify the PRACH, PUCCH, and SRS to avoid the subcarriers blanked based on block 815. Rather, the previous PRACH format and location, PUCCH format, and/or SRS format, location, and duration may happen to not overlap with the subcarriers blanked and, therefore, no action needs to be taken for one or more of the PRACH, PUCCH, or SRS.

At block 855, uplink and downlink communications between the UE and BS can be performed using the determined PRACH, PUCCH, and SRS configurations that avoid the blanked one or more subcarriers. As part of block 855, the UE may be scheduled to transmit uplink data on particular subcarriers and times. The BS would schedule such transmissions to avoid the blanked subcarriers of block 815. Periodically or occasionally, a remeasurement of the signal strengths as performed at block 810 may be performed to confirm which frequency band the primary entity is using. Blocks 820 through 850 may be reperformed as needed to ensure the proper subcarriers are blanked.

At block 860, a determination may be made that the primary entity is not exercising its priority to its spectrum. Similar to block 805, the determination of block 860 may be based on determining when the orbit of the satellite is now outside a line-of-sight of the ground station of the primary entity. Again here, the primary entity may provide tracking information for the satellite or may provide a resource (e.g., website, API) for the secondary entity to determine when the satellite is scheduled to cease communicating with the ground station. A margin of error may be built-in such that the secondary entity does not begin using the restricted spectrum until a time after the primary entity is scheduled to cease using it. Alternatively, signal strength measurements may be performed to determine when the primary user has ceased using its reserved spectrum.

At block 865, the blanking and configuration management system 340 can release the base station from its assigned PUCCH, PRACH, and SRS configurations and allow the base station to reset as needed. Alternatively, system 340 can send new configurations for the PUCCH, PRACH, and/or SRS that do not involve blanking any particular subcarriers. At block 870, the UE may be reconfigured as desired and uplink and downlink communication between the BS and UE can continue to be performed without blanking of any subcarriers.

At some point in the future, such as when the satellite again is about to enter the line-of-sight of the ground station, method 800 can be repeated to ensure no interference with the communications of the primary user occur. While the embodiments detailed herein focus on protecting a primary user's satellite communication from interference, similar embodiments can be used for protecting other forms of primary users from interference from one or more base stations of the cellular network, while still allowing the cellular network to communicate using PRBs that overlap the protected spectrum.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for dynamically adjusting physical resource block usage on a cellular network, the method comprising:
   determining, by the cellular network, that a primary entity is exercising its priority to spectrum overlapping a plurality of physical resource blocks (PRBs) that is used by the cellular network for communication with a plurality of user equipment (UE);
   measuring, by the cellular network, signal strengths of wireless transmissions by the primary entity on a plurality of frequency bands overlapping the plurality of PRBs;
   determining, by the cellular network, a frequency band of the plurality of frequency bands being used by the primary entity based on measuring the signal strengths of wireless transmission by a system of the primary entity;
   identifying, by the cellular network, a plurality of subcarriers of the plurality of PRBs, wherein the plurality of subcarriers overlaps the frequency band;
   selecting, by the cellular network, a predefined Physical Random Access Channel (PRACH) format from a plurality of predefined PRACH formats based at least in part on the identified plurality of subcarriers;
   selecting, by the cellular network, a predefined Physical Uplink Control Channel (PUCCH) format from a plurality of predefined PUCCH formats based at least in part on the identified plurality of subcarriers; and
   transmitting, by the cellular network, a first indication of the selected predefined PRACH format, a second indication of the selected predefined PUCCH format, or both to the plurality of UE communicating with the cellular network.

2. The method of claim 1, further comprising:
   communicating, between the cellular network and a piece of UE of the plurality of UE, using the selected PRACH format, the selected predefined PUCCH format, or both.

3. The method of claim 2, wherein the system of the primary entity comprises a satellite and an earth station, wherein the satellite and the earth station communicate using the frequency band.

4. The method of claim 3, wherein only a subset of base stations of a plurality of base stations of the cellular network uses the predefined PUCCH format, the predefined PRACH format, or both based on the identified predefined group of PRBs that overlaps the frequency band.

5. The method of claim 2, further comprising:
after transmitting the first indication and the second indication, determining that the system of the primary entity is no longer exercising its priority to the spectrum overlapping the plurality of PRBs; and
in response to determining that the system of the primary entity is no longer exercising its priority to the spectrum, releasing the cellular network from using the predefined PRACH format, the predefined PUCCH format, or both.

6. The method of claim 1, wherein determining that the system of the primary entity is exercising its priority to the spectrum overlapping the plurality of PRBs that is used by the cellular network is based at least in part on a current time.

7. The method of claim 1, further comprising:
determining, by the cellular network, a sounding reference signal (SRS) structure to use based at least in part on the identified plurality of subcarriers.

8. The method of claim 7, wherein the SRS structure determined is additionally based on the selected predefined PRACH format and the selected predefined PUCCH format.

9. The method of claim 1, wherein the cellular network is a 5G New Radio (NR) cellular network.

10. A cellular network system, comprising:
a plurality of base stations; and
a blanking and configuration management system, configured to:
determine that a primary entity is exercising its priority to spectrum overlapping a plurality of physical resource blocks (PRBs) that is used by a base station of the plurality of base stations for communication with a plurality of user equipment (UE);
determine signal strengths of wireless transmissions by the primary entity on a plurality of frequency bands overlapping the plurality of PRBs;
determine a frequency band of the plurality of frequency bands being used by the primary entity based on measuring the signal strengths of wireless transmission by a system of the primary entity;
identify a plurality of subcarriers of the plurality of PRBs, wherein the plurality of subcarriers overlaps the frequency band;
select a predefined Physical Random Access Channel (PRACH) format from a plurality of predefined PRACH formats and a PRACH location based at least in part on the identified plurality of subcarriers;
select a predefined Physical Uplink Control Channel (PUCCH) format from a plurality of predefined PUCCH formats based at least in part on the identified plurality of subcarriers; and
transmit a first indication of the selected predefined PRACH format, a second indication of the selected predefined PUCCH format, or both to the plurality of UE communicating with the base station.

11. The system of claim 10, wherein the base station is a gNodeB and the cellular network system is a 5G New Radio (NR) cellular network.

12. The system of claim 11, wherein the blanking and configuration management system is part of the gNodeB.

13. The system of claim 11, wherein the blanking and configuration management system is distinct from the gNodeB.

14. The system of claim 11, further comprising:
a primary entity system, comprising a satellite and an earth station, wherein the satellite and the earth station communicate using the frequency band.

15. The system of claim 11, wherein only a subset of base stations of the plurality of base stations of the cellular network uses the predefined PUCCH format, the predefined PRACH format, or both based on the identified predefined group of PRBs that overlaps the frequency band.

16. The system of claim 11, wherein the blanking and configuration management system is further configured to:
determine that the system of the primary entity is no longer exercising its priority to the spectrum overlapping the plurality of PRBs after transmitting the first indication and the second indication; and
release the cellular network from using the predefined PRACH format, the predefined PUCCH format, or both in response to determining that the system of the primary entity is no longer exercising its priority to the spectrum.

17. The system of claim 10, further comprising the plurality of UE that includes a UE, wherein the base station and the UE communicate using the selected PRACH format, the selected predefined PUCCH format, or both.

18. The system of claim 10, wherein determining that the primary entity is exercising its priority to the spectrum overlapping the plurality of PRBs is based at least in part on a predicted orbit of a satellite of the primary entity.

19. The system of claim 10, wherein the blanking and configuration management system is further configured to:
determine a sounding reference signal (SRS) structure to use based at least in part on the identified plurality of subcarriers.

20. The system of claim 19, wherein the SRS structure determined is additionally based on the selected predefined PRACH format and the selected predefined PUCCH format.

* * * * *